Figure 1:
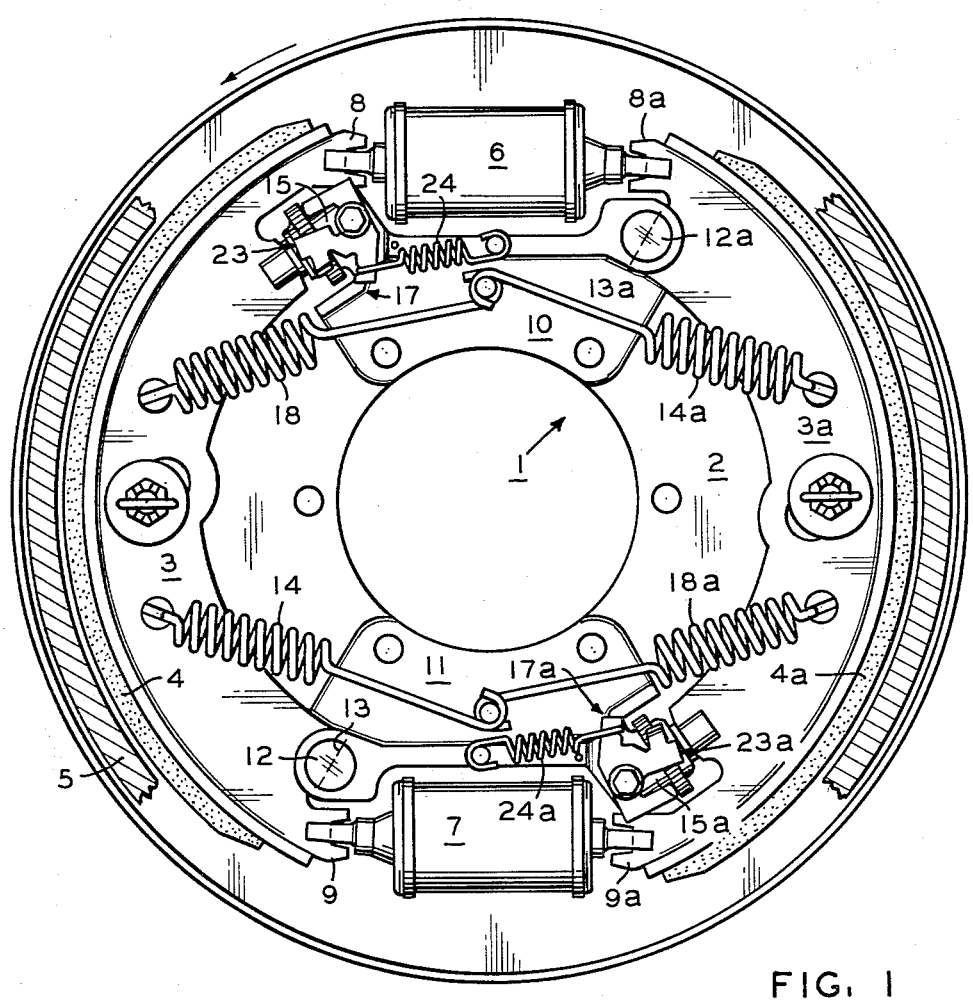

Feb. 16, 1965   R. L. GOLD   3,169,610
AUTOMATIC ADJUSTOR
Filed July 26, 1963   2 Sheets-Sheet 1

INVENTOR
ROBERT L. GOLD
BY
*Joseph E. Papin*

Feb. 16, 1965   R. L. GOLD   3,169,610
AUTOMATIC ADJUSTOR
Filed July 26, 1963   2 Sheets-Sheet 2
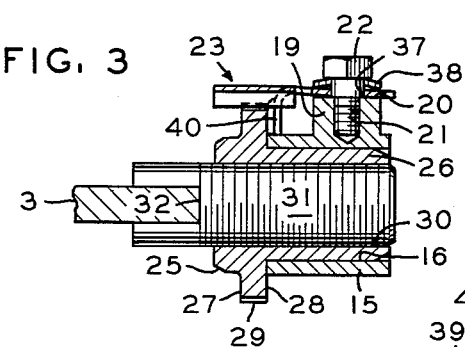
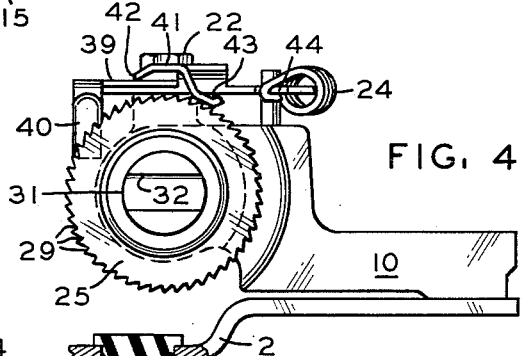
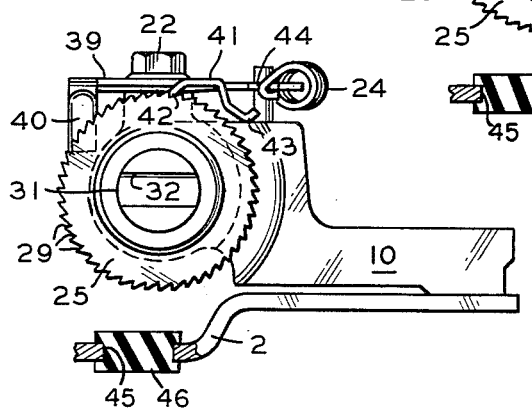
INVENTOR
ROBERT L. GOLD
BY
*Joseph E. Papin*

United States Patent Office 3,169,610
Patented Feb. 16, 1965

3,169,610
AUTOMATIC ADJUSTOR
Robert L. Gold, Pine Lawn, Mo., assignor to Wagner Electric Corporation, St. Louis, Mo., a corporation of Delaware
Filed July 26, 1963, Ser. No. 297,835
7 Claims. (Cl. 188—79.5)

This invention relates to automatic adjustors and in particular to adjustors cooperable with radially actuated friction producing members.

In the past, automatic adjustment mechanisms were employed to normally maintain a predetermined displacement between the friction members thereof and a co-operating friction producing element or drum in order to compensate for friction member wear occasioned by frictional engagement with said drum. Such automatic adjustment mechanisms included an extendable link which predetermined the retracted position of a friction member and a rotary member which was threadedly engaged with said link to control the extension thereof, said rotary member having a peripheral portion with an irregular or saw-tooth type surface. In addition, movable adjustor or lever means included detent or pawl means which were drivingly engageable with said irregular surface to adjustably rotate said rotary member in one direction and adjust the extension of the strut when the displacement of said friction member exceeded a predetermined amount. One of the more objectionable features of such automatic adjustment mechanisms was the difficulty in manually de-actuating or "backing-off" the rotary member to move the friction member in a retracting direction in the event of over adjustment or to install new friction members or the like. In other words, the engagement of the pawl means with the saw-tooth type surface of the rotary member normally tended to obviate rotation of said rotary member in a direction other than the abovementioned one direction to extend the strut and adjust the friction member toward the drum. Another objectional feature of such automatic adjustment mechanisms was that the adjustor was necessarily manually deflected out of engagement with the rotary member in order to manually back-off said rotary member.

The primary object of the present invention is to provide an automatic adjustment mechanism which overcomes the abovementioned objectionable features.

This and other objects and advantages of the present invention will become apparent hereinafter.

Briefly, the invention embodies adjustment means for predetermining the retracted position of a displaceable friction member, and movable adjustor means having pawl means driving said adjustment means to adjust the retracted position of said friction member upon friction member displacement in excess of a predetermined amount, said adjustor means including other means for normally disengaging said pawl means from said adjustment means.

Figure 2:
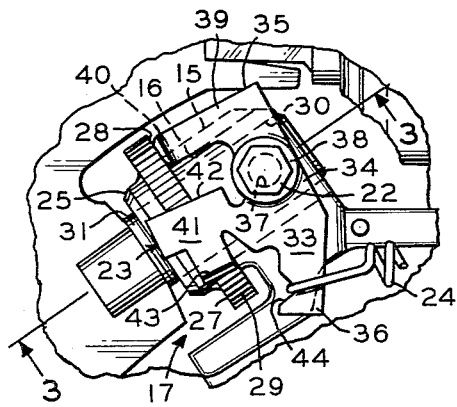

The invention also consists in the parts and arrangements and combination of parts hereinafter described and claimed. In the accompanying drawings which form a part of the specification and wherein like numerals refer to like parts wherever they occur:

FIG. 1 is an elevational view of a friction device showing the preferred embodiment of the present invention therein, FIG. 2 is a greatly enlarged fragmentary view taken from FIG. 1, FIG. 3 is a sectional view taken along line 3—3 of FIG. 2, FIG. 4 is a left-end view of FIG. 3 which illustrates the adjustor in its normal position, and FIG. 5 is another left-end view of FIG. 3 illustrating the adjustor in its fully displaced position.

Referring now in particular to FIGS. 1–3, a friction device or brake assembly 1 is provided with a backing plate or dust shield 2, and a pair of opposed, radially displaceable friction members or brake shoes 3, 3a are slidably disposed on said backing plate having friction material or linings 4, 4a thereon for frictional engagement with a relatively rotatable friction producing member or brake drum 5. Actuator motors or wheel cylinders 6 and 7 are secured to the backing plate 2 and are operatively interconnected with the adjacent ends 8, 8a and 9, 9a of the brake shoes 3, 3a, said motors being either the fluid pressure actuated type or the mechanically actuated type, both of which are well known in the art. Anchor brackets 10 and 11 are also secured to the backing plate 2 between the adjacent brake shoe ends 8, 8a and 9, 9a and said anchor brackets are adapted for fixed connection, along with said backing plate, to a non-rotatable axle flange or housing (not shown). Rotatable anchor pins 12, 12a having radially extending anchoring surfaces 13, 13a are pivotally mounted in the anchor brackets 11, 10 and return springs 14, 14a are connected between the brake shoes 3, 3a and anchor brackets 11, 10 to normally urge the brake shoe ends 9, 8a into sliding anchoring engagement with the anchor surfaces 13, 13a. The anchor brackets 10, 11 are also provided with integrally formed cylinder portions or housings 15, 15a having bores 16, 16a extending therethrough in which adjustable anchor means or adjustment mechanisms, indicated generally at 17, 17a, are housed (to be discussed later), and return springs 18, 18a are connected between the brake shoes 3, 3a and anchor brackets 10, 11 to normally urge the brake shoe ends 8, 9a into engagement with said adjustable anchor means. When the drum 5 is rotating in the forward direction, as indicated by the directional arrow in FIG. 1, the brake shoe ends 8a, 9 are the anchoring ends, and the brake shoe ends 8, 9a are the unanchored or displaceable ends; however, when said drum is rotating in the reverse direction opposite to the directional arrow, the anchoring and displacement ends of said brake shoes are also reversed, i.e. brake shoe ends 8, 9a become the anchored ends and brake shoe ends 8a, 9 become the displaceable ends. The anchor bracket housings 15, 15a are provided with mounting hubs 19, 19a having bearing surfaces 20, 20a thereon, and threaded mounting apertures 21, 21a are provided through said mounting surfaces to cooperatively receive threaded pivot pins 22, 22a which pivotally support adjustor or lever means, indicated generally at 23, 23a (to be discussed hereinafter). Adjustor or actuating springs 24, 24a are biased between the adjustor means 23, 23a and the anchor brackets 10, 11.

Since the adjustable anchoring means 17, 17a and adjustors 23, 23a, respectively, are for all practical purposes of identical construction and configuration and have identical adjusting cycles or operational functions, only the adjustment mechanism 17 and adjustor 23 along with their respective adjusting cycles will be described hereinafter in detail for purposes of brevity. The adjustment mechanism 17 is provided with a rotary or adjusting member 25 having an axial or cylindrical portion 26 slidably and rotatably received in the anchor bracket housing bore 16, and a radial extending adjustment flange or wheel 27 is integrally formed on said cylindrical portion exteriorly of said bore. A radially extending abutment shoulder 28 is provided on the rotary member 25 at the juncture of the cylindrical portion 26 and the adjustment flange 27, and a plurality of successive grooves or notches 29 are provided on the peripheral surface of the adjustment flange 27. An axial threaded bore 30 is also provided through the rotary member 25 which cooperatively receives a threaded extendable member or strut 31 having a shoe guide slot or anchoring surface 32 in the outer or exterior end thereof for sliding and retaining engagement with the brake shoe end 8. The compressive force of the return spring 18 normally urges the brake shoe end 8 into engagement with the slot 32 which, in turn, serves to normally bias the abutment shoulder 28 of the rotary member 25 into engagement with the outer end of the anchor bracket housing 15.

The present invention is primarily concerned with automatic adjustment of the brake shoes 3, 3a upon displacement movement thereof in excess of a predetermined amount relative to the drum 5 to compensate for wear of the brake shoe linings 4, 4a occasioned during frictional engagement with said drum, and for this purpose, the automatic adjustors 23, 23a are provided. The adjustor 23 is provided with a body portion 33 formed from relatively thin sheet material, and the body 33 is provided with a base portion or pivot arm 34 having opposed free end portions 35, 36. A mounting aperture or pivot pin receiving opening 37 is provided in the adjustor body 33 near the midportion thereof. The mounting aperture 37 is pivotally received on the pivot pin 22, and the pivot arm 34 of the adjustor body 33 is adapted to be pivotally or rotatably mounted on the bearing surface 20 of the anchor bracket housing 15. A spring or deflection washer 38 is received on the pivot pin 22 and is biased between said pivot pin and the pivot arm 34 to normally urge the adjustor body 33 toward bearing engagement with the bearing surface 20 while also providing limited deflection of said adjustor body away from said bearing surface. The adjustor body 33 is provided with a follower or abutment arm 39 which is substantially perpendicular to and integrally formed with the pivot arm 34 adjacent to the free end 35 thereof, and a depending bearing flange 40 is integrally formed on the free end of said follower arm normally in bearing or following engagement with the radial surface 28 of the adjustment member 25. A driving or lever arm 41 is provided in spaced relation with the follower arm 39 and is integrally formed with the pivot arm 34 adjacent to the midportion thereof, and a depending tooth or pawl portion or detent 42 is integrally formed adjacent to the free end of said driving arm for driving engagement with the notches 29 on the peripheral surface of the driven rotary member 25. The driving arm 41 is also integrally provided with a lifting flange or deflection arm 43 adjacent to the free end thereof which is normally in a lifting position in engagement with the peripheral surface of the rotary member flange 27. In its lifting position, the lifting flange 43 serves to deflect the adjustor body 33 against the deflection spring 38 to a skewed position relative to the hub bearing surface 20 of the anchor bracket housing 15 so as to maintain the detent 42 of the driving arm 41 normally disengaged from the rotary member notches 29 when said adjustor body is in its normal or retracted position, as shown in FIG. 4. When the lifting flange 43 is in its lifting position, it should be noted that its engagement with the rotary member flange 27 prevents unwarranted or undesirable adjusting rotation of the rotary member 25 due to vehicle vibration or road bumps or the like. To complete the description of the adjustor 23, a spring receiving notch or groove 44 is provided in the pivot arm 34 adjacent the lower end 36 thereof to receive the actuating or adjusting spring 24.

In the operation of the friction device 1, assume that the friction lining 4 is sufficiently worn to warrant adjustment of said friction device and that the component parts of said friction device are positioned as previously described. Actuation of the wheel cylinders 6 and 7 by suitable means, such as a master cylinder or force applying mechanism or other like means well known in the art, establishes an actuating force to concertly move or displace the displaceable brake shoe ends 8, 9a from their normally retracted positions to pivotally and slidably displace the anchoring brake shoe ends 8a, 9 on the anchor pins 12, 12a. This displacement movement of the brake shoes 3, 3a in response to the actuating force is, of course, greater than the predetermined displacement since it was assumed that an adjustment was warranted, and such excess displacement movement frictionally engages the friction linings 4, 4a with the rotating drum 5 to energize the friction device 1 in the forward direction, as indicated by the directional arrow in FIG. 1. The compressive force of the adjustment spring 24 serves to pivot the adjustor body 33 in a counterclockwise direction about the pivot pin 22 upon displacement of the brake shoe end 8 from its normal retracted position, and the follower arm 30, which is in abutment with the rotary member abutment surface 28, slidably moves the adjustment mechanism 17 in the anchor member housing bore 16 in an outward direction to maintain the anchoring surface 32 of the adjustment strut 31 in follow-up engagement with the displaced brake shoe end 8. In other words, the adjustment spring 24 urges the adjustor body 33 and adjustment mechanism 17 in follow-up displacement movement with the brake shoe 3 from its normal retracted position to its displaced position. Upon the initial pivotal movement of the adjustor body 33, the deflection spring 38 moves or deflects said body into bearing engagement with the hub bearing surface 20, and since the driving arm 41 is pivotally movable with said adjustor body, the lifting flange 43 is moved from its lifting position to a deflected position. When the lifting flange 43 is moved to its deflected position, it should be noted that the detent 42 on the driving arm 41 is concertly moved or deflected therewith into engagement with a notch 29 on the rotary member flange 27. In the deflected position, the lifting flange merely rides on or is slightly engaged with the peripheral surface of the rotary member flange 27. Further follow-up pivotal displacement of the adjustor body 33 in excess of the predetermined displacement disengages the lifting flange 43 from the rotary member flange 27 (as shown in FIG. 4) and moves the detent 42 up the surface of the notch 29 with which it is engaged so as to again slightly skew said adjustor body relative to the hub bearing surface 20 against the deflective force of the spring 38, and the deflective force of said spring subsequently moves or deflects said detent into driving engagement with the next successive notch 29 on said rotary member flange while again returning said adjustor body into bearing engagement with said hub bearing surface.

When the friction device 1 is de-energized, the wheel cylinders 6, 7 are de-actuated thus eliminating the actuating force, and the compressive forces of the return springs 14, 14a and 18, 18a retractively move the brake shoes 3, 3a toward their retracted or original positions. The retractile movement of the brake shoe 3 serves to slidably move the adjustment mechanism 17 in the anchor bracket housing bore 16 toward its retracted or original position, and since the follower arm 39 of the adjustor body 33 is biased into engagement with the rotary member abutment surface 28, this retractile or return movement of said adjustment mechanism pivots said adjustor body in a clockwise direction about the pivot pin 22 against the compressive force of the actuating spring 24 so as to return the adjustor 23 to its original position. This return pivotal movement of the adjustor 23 to its original position serves also to pivot the driving arm 41 to its original position, and since the detent 42 is drivingly engaged with the next successive notch 29 in the rotary member flange 27, the initial return pivotal movement of said driving arm adjustably drives or rotates the rotary member 25 in the anchor member housing bore 16. Since concert rotation of the strut 31 with the rotary member 25 is prevented by the engagement between the strut slot 32 and the brake shoe end 8, the driving adjustment or rotation of said rotary member 25 effects further threaded engagement between the threaded bore 30 thereof and the strut 31 to adjustably displace or move said strut outwardly and adjust the retracted position of the brake shoe 3. In this manner, the adjusting displacement of the strut 31 effectively moves the retracted position of the brake shoe 3 to predeterminately reposition the friction lining 4 closer to the brake drum 5 and thereby adjust the friction device 1.

Subsequent to the adjustment of the friction device 1, further return or retractile pivotal movement of the adjustor body 33 re-engages the lifting arm 43 with the peripheral surface of the rotary member flange 27 and returns said lifting arm to its lifting position thereon. The return of the lifting arm 43 to its lifting position, of course, serves to return the adjustor body 33 to its original skewed position relative to the hub bearing surface 20 against the deflective force of the spring 38 and, at the same time, disengages the detent 42 from driving engagement with the rotary member notch 29. Continued wear of the friction lining 4 will, of course, occasion further automatic adjustment of the friction device 1 by the adjusting mechanism in the same manner as previously described.

The friction device 1 may also be manually adjusted, and for this purpose the usual access aperture or openings 45, of which only one is shown in FIG. 4, is provided in the backing plate 2 substantially in alignment with each of the rotary member flanges 27, 27a, and resilient closure members 46 are normally removably secured in said access opening to prevent the entry of foreign materials into the interior of said friction device. Removal of the resilient closure members 46 permits the manual insertion of an adjusting tool, such as a screwdriver or the like (not shown), through the access openings 45 into manual driving engagement with the notches 29 of the rotary member flange 27 to rotate the rotary member 25 and effect adjustment of the brake shoe 3 relative to the drum 5, as previously described. It should be noted that since the normal or lifting position of the lifting arm 43 in engagement with the rotary member flange 27 disengages the detent 43 from the notches 29 in said rotary member flange, the rotary member 25 may be manually adjusted or backed-off relative to said lifting arm and detent to adjustably move the retracted position of the brake shoe 3 toward or away from the drum. Such manual adjustment or backing-off of the rotary member 25 would, of course, be substantially obviated if the normal retracted position of the detent 42 was in engagement with one of the rotary member notches 29.

It is apparent to those skilled in the art that the adjusting mechanism 17 or adjustor 23 is not necessarily restricted or limited for use for the particular type or geometric configuration of the friction device 1 which is shown and described herein only for purposes of illustration. Further, the actuator motors or wheel cylinders 6 and 7 are shown and described in conjunction with the friction device 1 only for purposes of illustration, and it is also apparent to those skilled in the art that other means, such as cams, wedges and rollers or like mechanical means well known in the art, may be employed to impart the actuating force to the brake shoes 3, 3a to energize said friction device.

From the foregoing, it is now apparent that novel automatic adjusting means for a friction device meeting the objects set out hereinbefore are provided and that changes or modifications as to the precise configurations, shapes or details of the construction set forth in the disclosure by way of illustration may be made by those skilled in the art without departing from the spirit of the invention as defined by the claims which follow.

What I claim is:

1. In a friction device having a pair of relatively displaceable members adapted for energization into frictional engagement, adjustable means movably supported in said friction device and engaged with one of said friction members for concert displacement therewith, said adjustable means being rotatably driven relative to said one friction member to adjust the displacement thereof, and resiliently urged means pivotally supported on a fixed portion of said friction device for driving engagement with said adjustable means including means normally engaged with said adjustable means to maintain said resiliently urged means in a position out of driving engagement with said adjustable means.

2. In a friction device having a pair of relatively displaceable members adapted for energization into frictional engagement, adjustable means movably supported in said friction device and engaged for concert displacement with one of said friction members, said adjustable means being rotatably driven relative to said one friction member to adjust the displacement thereof, and resiliently urged means pivotally supported on a fixed portion of said friction device and urging said adjustable means toward engagement with said one friction member including driving means for driving engagement with said adjustable means, and lifting means normally engaged with said adjustable means to deflect said driving means to a position out of driving engagement with said adjustable means.

3. In a friction device having a pair of relatively displaceable members adapted for energization into frictional engagement, adjustable means movably supported in said friction device and engaged with one of said friction members for concert displacement therewith, said adjustable means being rotatably driven relative to said one friction member to adjust the displacement thereof, resiliently urged means pivotally supported on a fixed portion of said friction device and urging said adjustable means toward engagement with said one friction member including driving means for driving engagement with said adjustable means, and means normally engaged with said adjustable means to maintain said driving means disengaged from said adjustable means, said resiliently urged means being pivotally movable in one direction in response to energization of said friction members to disengage said last named means from said adjustable means and drivingly engage said driving means with said adjustable means and pivotally movable in the opposite direction in response to de-energization of said friction members to effect driving rotation of said adjustable means and adjust the displacement of said one friction member.

4. In a friction device having a pair of relatively displaceable friction members adapted for energization into frictional engagement, adjustment means movably supported in said friction device and including an extendable strut connected with one of said friction members to adjust the displacement thereof relative to the other of said friction members and actuating means rotatable to extend said strut and adjust the relative displacement between said friction members, resiliently urged means pivotally supported on a fixed portion of said friction device for driving engagement with said actuating means, said last named means normally urging said adjustment means toward engagement with said one friction member for concert movement therewith, and a lifting flange normally engaged with said adjustment means to maintain said last named means in a position out of driving engagement with said actuating means, said last named means being pivotally movable to displace said adjustment means in concert with displacement movement of said one friction member and disengage said lifting flange from said adjustment means, and other means for deflecting said last named means into driving engagement with said actuating means to effect adjusting rotation thereof and extend said strut member to adjust the relative displacement of said friction members.

5. In a friction device having a pair of relatively displaceable friction members, adjustable means movably supported in said friction device including an extendable strut and a rotatable wheel member for controlling the extension of said strut and having an irregular peripheral portion, resilient means normally urging said friction member to a retracted position into engagement with said strut, force responsive means for moving said friction member into a displaced position, resiliently urged means pivotally supported on a fixed portion of said friction device and normally urging said adjustable means in follow-up relation with said friction member, driving means on said resiliently urged means for engagement with the peripheral portion of said wheel member, lifting means on said resiliently urged means normally engaged with said wheel member to lift said driving means from engagement with the peripheral portion of said wheel member, said resiliently urged means being pivoted upon displacement movement of said one friction member to disengage said lifting means from said wheel member, and means translating displacement movement of said friction member into deflection of said resiliently urged means to engage said driving means with a successive portion of the periphery of said wheel member and adjustably rotate said wheel member upon retractile movement of said friction member and adjustable means toward the retracted position.

6. In a friction device having a pair of relatively displaceable friction members adapted for energization into frictional engagement, extendable adjustment means movably supported in said friction device, said adjustment means being normally urged into engagement with one of said friction members for concert displacement therewith upon energization of said friction members into frictional engagement and normally defining the retracted position of said one friction member including wheel means rotatable to control the extension of said adjustment means and adjust the retracted position of said one friction member, adjustor means supported on said friction device adjacent to said adjustment means, resilient means normally urging said adjustor means into engagement with said adjustment means to effect concert movement of said adjustment means with said one friction member upon displacement movement thereof, driving means on said adjustor means for driving engagement with said wheel means, means connected with said adjustor means and normally engaged with said adjustment means to deflect said driving means from engagement with said wheel means, and other means for deflecting said adjustor means upon disengagement of said last named means from said adjustment means to drivingly engage said driving means with said wheel means, said driving means being pivotally movable with said adjustor means in response to return movement of said adjustment means and friction member toward the retracted position upon de-energization of said friction means to effect adjusting rotation of said wheel means.

7. In combination, a friction device having at least one friction member movable between a normal retracted position and a displaced position in frictional engagement with a friction producing element, said friction member having opposed anchoring and displaceable end portions, a cylinder mounted on said friction device adjacent to the displaceable end of said friction member, force responsive means movable in said cylinder and connected with the displaceable end portion of said friction member for urging said friction member to the displaced position, adjustment means engaged with said friction member adjacent to the displaceable end portion thereof including an extendable strut defining the retracted position of said friction member, and a rotatable member slidably and rotatably received in a fixed portion of said friction device, said rotatable member having a notched peripheral surface and being threadedly engaged with said strut to control the extension thereof, resilient means urging said friction member toward the retracted position into engagement with said strut, lever means pivotally supported on the fixed portion of said friction device including driving means for engagement with the notched peripheral surface of said rotatable member, an abutment portion on said lever means and engaged with said adjustment means, other resilient means urging said lever means in one direction to concertly move said adjustment means with said friction member when said friction member is moved towards the displaced position, a lifting portion on said lever means normally engaged with said rotatable member and displacing said driving means from engagement with the notched peripheral surface of said rotatable member, said lifting portion being movable with said lever means to a position disengaged from said rotatable member, and means translating the displacement movement of said friction member greater than a predetermined amount into deflection movement of said lever means to engage said driving means with a successive notch on the periphery of said rotatable member, said lever means being pivoted in the opposite direction in response to the retractile movement of said friction member and adjustment means to the retracted position to initially move said driving means and adjustably rotate said rotatable member into further threaded engagement with said strut thereby extending said strut to adjust the retracted position of said friction member and subsequently re-engage said lifting portion with said rotatable member.

No references cited.